(12) United States Patent
Chen et al.

(10) Patent No.: US 7,736,029 B2
(45) Date of Patent: Jun. 15, 2010

(54) LENS ARRAY AND ILLUMINATION MODULE

(75) Inventors: Ko-Shun Chen, Hsinchu (TW); Ching-Chuan Wei, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 225 days.

(21) Appl. No.: 12/120,240

(22) Filed: May 14, 2008

(65) Prior Publication Data
US 2009/0168392 A1 Jul. 2, 2009

(30) Foreign Application Priority Data
Dec. 31, 2007 (TW) .............................. 96151573 A

(51) Int. Cl.
*F21V 5/00* (2006.01)
(52) U.S. Cl. .................... 362/330; 362/19; 362/332; 362/335; 362/336
(58) Field of Classification Search ............... 362/19, 362/330, 332, 335, 336, 522; 353/38, 102
See application file for complete search history.

(56) References Cited

U.S. PATENT DOCUMENTS

| | | | |
|---|---|---|---|
| 6,092,901 A | 7/2000 | Hashizume et al. | |
| 6,273,569 B1 * | 8/2001 | Iechika et al. | 353/38 |
| 6,568,810 B2 | 5/2003 | Hori | |
| 6,860,607 B2 | 3/2005 | Yanagisawa | |

* cited by examiner

*Primary Examiner*—Stephen F Husar
(74) *Attorney, Agent, or Firm*—Jianq Chyun IP Office

(57) ABSTRACT

A lens array includes a first lens group with rows of first lenses having first optical surfaces, a second lens group with rows of second lenses having second optical surfaces, and a reference plane. Each first and second lenses extend along a first axis. The second lenses are disposed at two sides of the first lens group along a second axis perpendicular to the first axis. An optical axis of the second optical surface is perpendicular to the first and second axis. An optical axis of the first optical surface is perpendicular to the first axis and has an angle larger than 0 degree and smaller than 6 degrees with the optical axis of the second optical surface. The reference plane perpendicular to the second axis passes through the first lens group. A normal vector of each first optical surface on the optical axis points away from the reference plane.

15 Claims, 4 Drawing Sheets

LENS ARRAY AND ILLUMINATION MODULE

CROSS-REFERENCE TO RELATED APPLICATION

This application claims the priority benefit of Taiwan application serial no. 96151573, filed on Dec. 31, 2007. The entirety of the above-mentioned patent application is hereby incorporated by reference herein and made a part of specification.

BACKGROUND OF THE INVENTION

1. Field of the Invention

The present invention is related to a projection device, and particularly to a lens array and an illumination module using the same.

2. Description of Related Art

FIG. 1 is a schematic view of a conventional illumination module. Referring to FIG. 1, an illumination module 100 includes a light source 110, a first lens array 120, a second lens array 130 and a polarization converting system 140. The light source 110 emits an illuminating beam L10, and the first lens array 120 and the second lens array 130 are sequentially disposed on an optical path of the illuminating beam L10. The first lens array 120 and the second lens array 130 uniformize the illuminating beam L10. The polarization converting system 140 is disposed on the optical path of the illuminating beam L10 from the second lens array 130 and renders the illuminating beam L10 as a polarized polarization beam L120.

The polarization converting system 140 has a plurality of absorption devices 142, a plurality of polarization beam splitters 144, a plurality of reflection devices 146 and a plurality of half-wave plates 148. The illuminating beam L10 enters the polarization beam splitter 144, and a portion of the illuminating beam L10 penetrates the polarization beam splitter 144 and the half-wave plate 148. Another portion of the illuminating beam L10 is reflected by the polarization beam splitter 144 to the reflection device 146 and then reflected by the reflection device 146 to pass through the polarization converting system 140.

The absorption device 142, the polarization beam splitter 144, the reflection device 146 and the half-wave plate 148 are symmetrically disposed opposite to a reference plane 140a. The first lens array 120 and the second lens array 130 have a plurality of first lenses 122 and a plurality of second lenses 132 respectively. Each of the first lenses 122 and each of the second lenses 132 correspond to a central point of each polarization beam splitter 144 respectively. Since the polarization converting system 140 is symmetrically disposed, two adjacent symmetric polarization beam splitters 144a are disposed at two sides of the reference plane 140a. To coordinate with two adjacent polarization beam splitters 144a so that a first lens 122a and a second lens 132a both align with a central point of the polarization beam splitter 144a. A width d' of the first lens 122a and the second lens 132a corresponding to the polarization beam splitter 144a is smaller than a width d of the first lens 122 and the second lens 132. Thus, the illuminating beam L10 passing through the first lens array 120 and the second lens array 130 is rendered inconsecutive.

SUMMARY OF THE INVENTION

The present invention is directed to a lens array capable of rendering an illuminating beam passing through the lens array more uniform.

The present invention is directed to an illumination module having a better uniformity and efficiency.

According to an embodiment of the present invention, a lens array including a first lens group, a second lens group and a reference plane is provided. The first lens group includes a plurality of rows of first lenses having first optical curved surfaces, and the second lens group includes a plurality of rows of second lenses having second optical curved surfaces. Each of the first lenses and second lenses extend along a first axis. The second lens group is disposed at two sides of the first lens group along a second axis perpendicular to the first axis. An optical axis of each second optical curved surface is perpendicular to the first axis and the second axis. An optical axis of the first optical curved surface is perpendicular to the first axis and has an included angle larger than 0 degree and smaller than 6 degrees with the optical axis of the second optical curved surface. The reference plane is perpendicular to the second axis and passes through the first lens group so that the first lens group and the second lens group are symmetrically disposed with the reference plane. A normal vector of each first optical curved surface on the optical axis points away from the reference plane.

According to another embodiment of the present invention, an illumination module including a light source, a polarization converting system, a first lens array (i.e., the above-mentioned lens array) and a second lens array is provided. The light source is capable of emitting an illuminating beam. The polarization converting system is disposed on an optical path of the illuminating beam so as to convert the illuminating beam into a polarized beam. The first lens array is disposed on the optical path of the illuminating beam and located between the light source and the polarization converting system. The second lens array is disposed on the optical path of the illuminating beam and located between the first lens array and the polarization converting system.

In the present embodiment of the present invention, the optical axis of the first optical curved surface and the optical axis of the second optical curved surface have an included angle therebetween, so a width of a projection of the illuminating beam passing through the first lens extends towards a direction of the second axis. Therefore, the inconsecutiveness caused by the polarization converting system is reduced and the illumination quality of the illumination module is thus enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
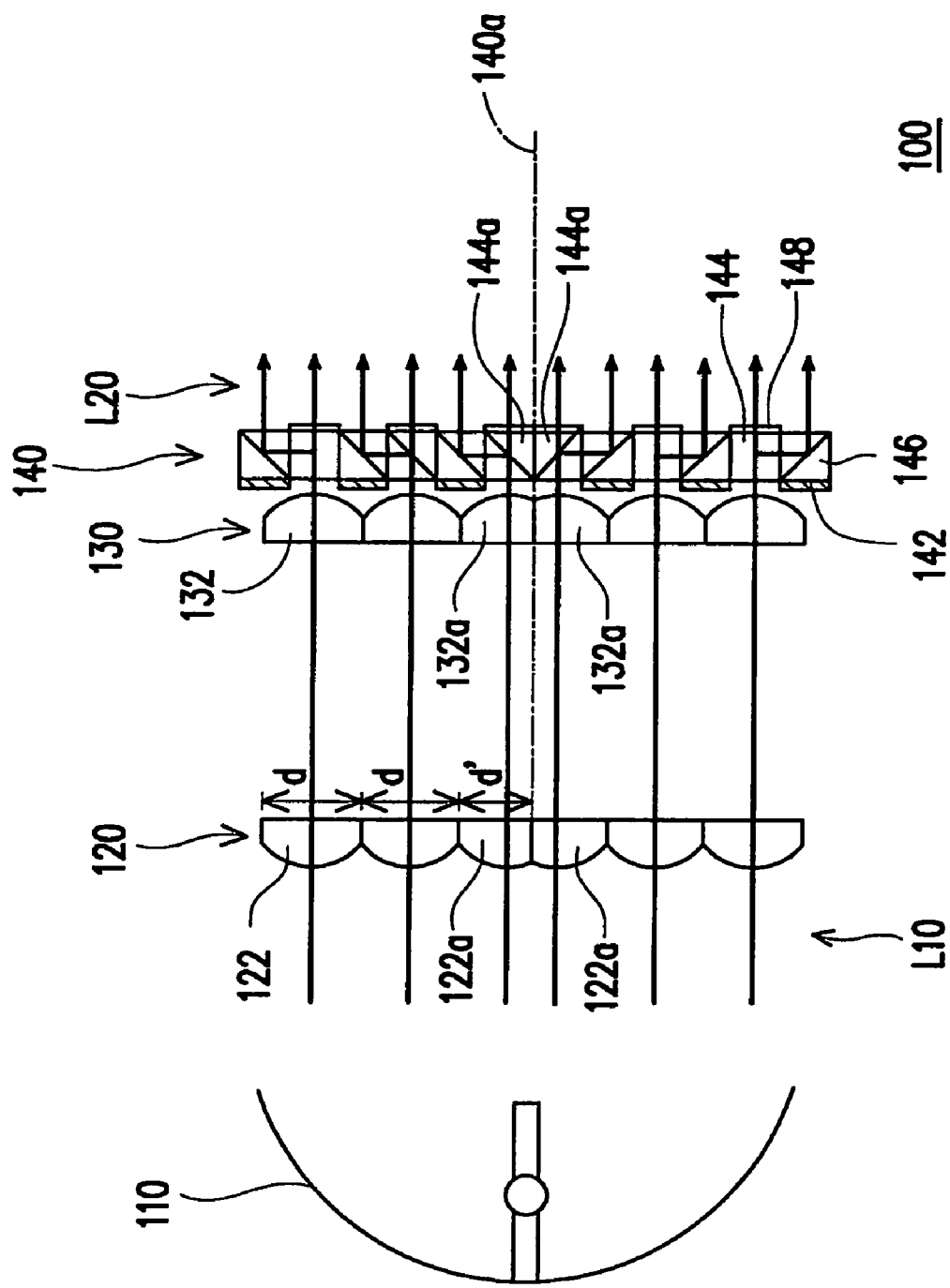
FIG. 1 illustrates a schematic view of a conventional illumination module.
Figure 2:
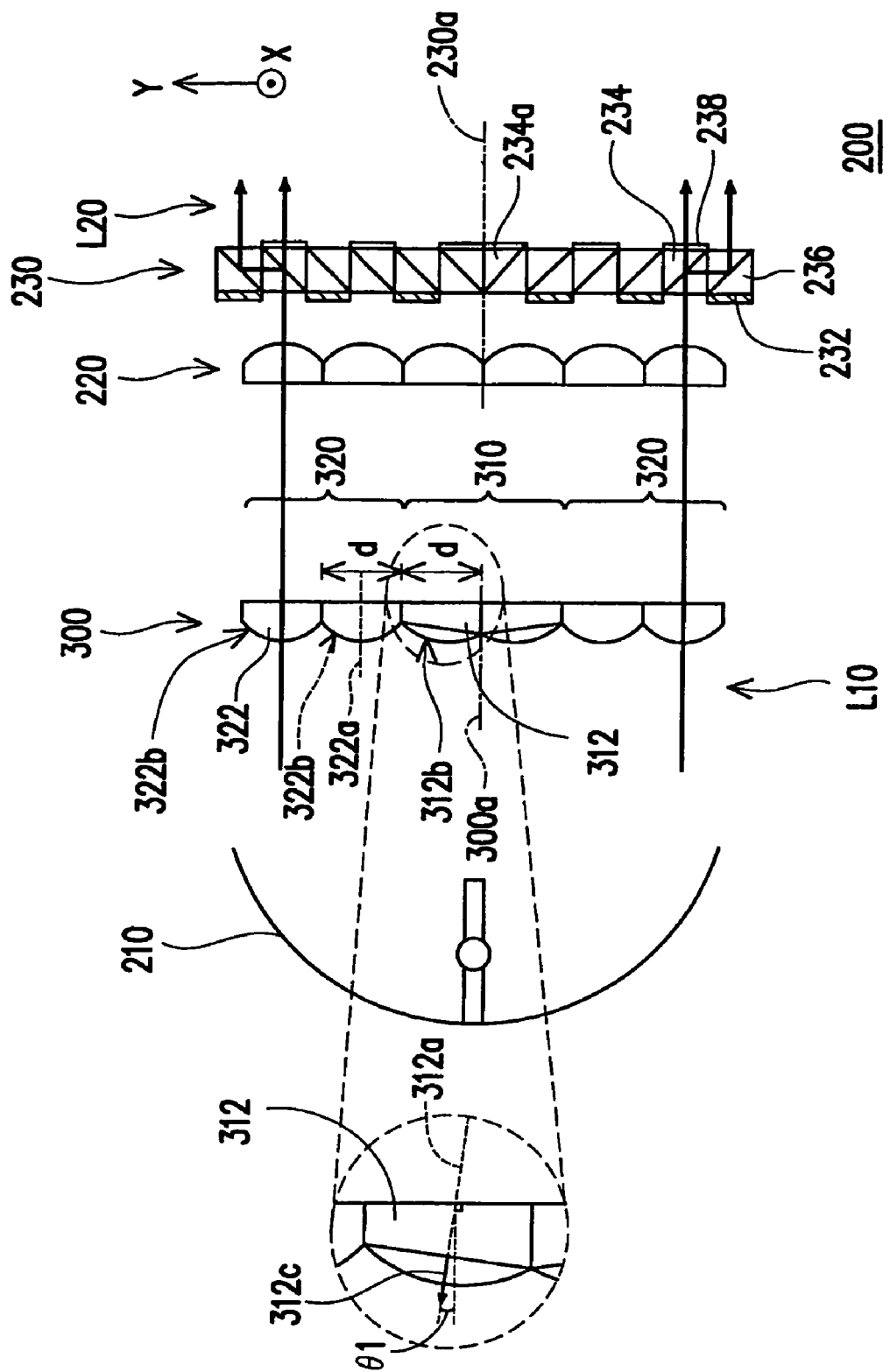
FIG. 2 illustrates a schematic view of an illumination module according to an embodiment of the present invention.

In the following detailed description of the preferred embodiments, reference is made to the accompanying drawings which form a part hereof, and in which are shown by way of illustrating specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive FIG. 2 illustrates a schematic view of an illumination module according to an embodiment of the present invention. Referring to FIG. 2, an illumination module 200 for a projection device is illustrated, for example. The illumination module 200 includes a light source 210, a first lens array 300, a second lens array 220 and a polarization converting system 230. The light source 210 emits an illuminating beam L10. The first lens array 300, the second lens array 220 and the polarization converting system 230 are sequentially disposed on an optical path of the illuminating beam L10. The illuminating beam L10 passing through the first lens array 300 and the second lens array 220 is converted into a uniform illuminating beam L10. Additionally, the polarization converting system 230 converts the illuminating beam L10 into a polarized beam L20.

In detail, the first lens array 300 includes a first lens group 310 and a second lens group 320. The first lens group 310 includes a plurality of rows of first lenses 312, and the second lens group 320 has a plurality of rows of second lenses 322. Each of the first lenses 312 has a first optical curved surface 312b, and each of the second lenses 322 has a second optical curved surface 322b. Each of the first lenses 312 and each of the second lenses 322 extend along a first axis X. The second lenses 322 are disposed at two sides of the first lens group 310 along a second axis Y perpendicular to the first axis X. An optical axis 322a of each of the second optical curved surfaces 322b is perpendicular to the first axis X and the second axis Y. An optical axis 312a of each of the first optical curved surfaces 312b is perpendicular to the first axis X and has an included angle θ1 with the optical axis 322a of each of the second optical curved surface 322b.

More specifically, the first lens array 300 has a reference plane 300a perpendicular to the second axis Y and passing through the first lens group 310 so that the first lens group 310 and the second lens group 320 are symmetrically disposed with the reference plane 300a. A normal vector 312c of each of the first optical curved surfaces 312b on the optical axis 312a points away from the reference plane 300a. The normal vector 312c passes through and is perpendicular to the first optical curved surfaces 312b. In other words, the optical axis 312a of each of the first optical curved surfaces 312b extends outward. The included angle θ1 is larger than 0 degree and smaller than 6 degrees. In the present embodiment, the included angle θ1 may be about 3.5 degrees.

According to the present embodiment, the polarization converting system 230 may be a symmetric polarization converting system. The polarization converting system 230 may have a plurality of absorption devices 232, a plurality of polarization beam splitters 234, a plurality of reflection devices 236 and a plurality of half-wave plates 238. The polarization beam splitter 234 is, for example, a polarization beam splitting prism. The reflection device 236 is a prism having a reflective coating, for example. The absorption device 232 is disposed on the reflection device 236 and the half-wave plate 238 is disposed on the polarization beam splitter 234. The illuminating beam L10 enters the polarization beam splitters 234, and a portion of the illuminating beam L10 penetrates the polarization beam splitters 234 and the half-wave plates 230. Another portion of the illuminating beam L10 is reflected by the polarization beam splitters 234 and then reflected by the reflection devices 236.

The polarization converting system 230 has a reference plane 230a. The absorption devices 232, the polarization beam splitters 234, the reflection devices 236 and the half-wave plates 238 are symmetrically aligned along the second axis Y with a reference plane 230a as a center. Adjacent polarization beam splitters 234a are disposed adjacent to two sides of the reference plane 230a. Each of the second lenses 322 may be disposed corresponding to a polarization beam splitter 234 and each of the first lenses 312 may be disposed corresponding to a polarization beam splitter 234a. As a result, the reference plane 300a of the first lens array and the reference plane 230a of the polarization converting system 230 coincide with each other.

Since the optical axis 312a of each of the first optical curved surface 312b and the optical axis 322a of each of the second optical curved surface 322b have the included angle θ1 therebetween, a width of a projection from the illuminating beam L10 passing through the first lens 312 extends towards a direction of the second axis Y. Therefore, shadow caused by adjacent polarization beam splitters 234a is mitigated and a polarized beam L20 is thereby rendered more uniform.

Figure 3A:
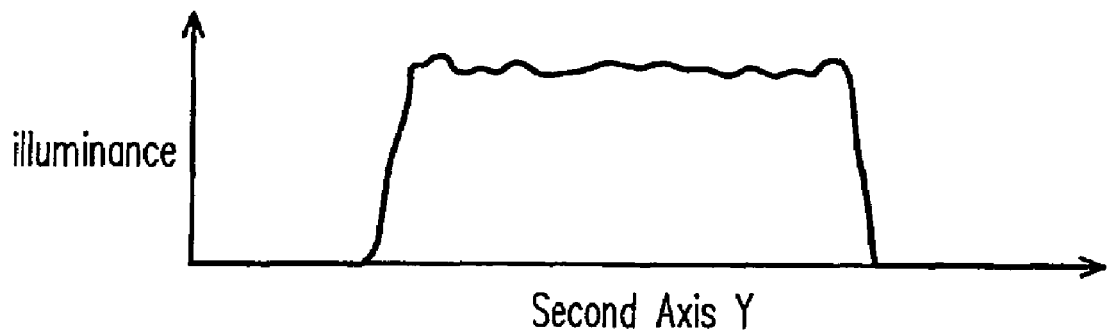
FIG. 3A illustrates an illuminance distribution diagram of a polarized beam emitted from the illumination module in FIG. 2.
Figure 3B:
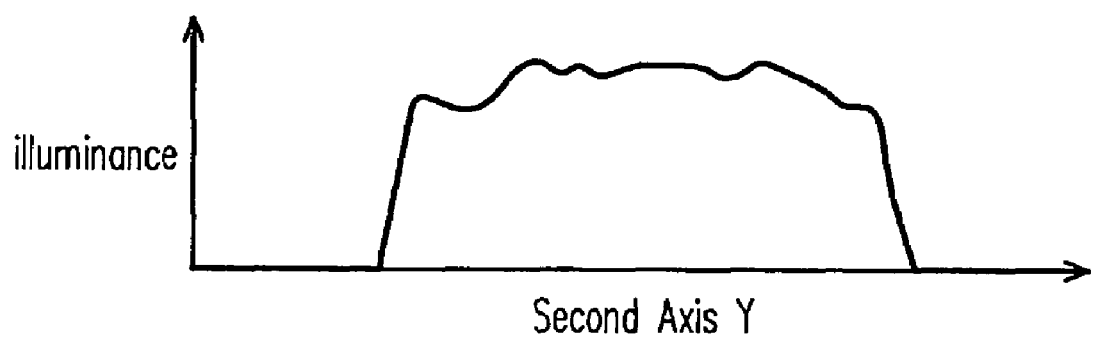
FIG. 3B illustrates an illuminance distribution diagram of a polarized beam emitted from a conventional illumination module.

Table 1 and Table 2 are comparison sheets between a lens array of a conventional illumination module and a lens array of the illumination module in the present embodiment. FIG. 3A is an illuminance distribution diagram of a polarized beam emitted from the illumination module of FIG. 2. FIG. 3B is an illuminance distribution diagram of a polarized beam emitted from a conventional illumination module.

Referring to Table 1, FIGS. 3A and 3B, it is shown from comparison between FIGS. 3A and 3B that an illuminance distribution of the polarized beam L20 in the present embodiment is significantly more uniform than an illuminance distribution of an illuminating beam in the conventional art. Furthermore, it is known from Table 1 that both the efficiency and the uniformity ratio of the illumination module in the present embodiment are higher than those of the conventional illumination module. Referring to Table 2, compared with an illumination module having a conventional lens array coordinated with an asymmetric polarization converting system, the illumination module 200 of the present embodiment has better efficiency and a higher uniformity.

TABLE 1

| | Efficiency (%) | Uniformity Ratio |
|---|---|---|
| Conventional lens array coordinated with a symmetric polarization converting system | 53% | 83% |
| First lens array coordinated with the symmetric polarization converting system in the present embodiment | 54.2% | 93% |
| Gain ratio | 2.26% | 12% |

TABLE 2

| | Efficiency (%) | Uniformity Ratio |
|---|---|---|
| Conventional lens array coordinated with an asymmetric polarization converting system | 51.9% | 81% |
| First lens array coordinated with the symmetric polarization converting system in the present embodiment | 54.2% | 93% |
| Gain ratio | 4.43% | 14.8% |

According to the present embodiment, the first lens group 310 may have two rows of the first lenses 312, however, the present invention is not limited thereto. People skilled in the art may adjust the number of the first lenses 312 according to the actual requirement. Moreover, a curvature of the first optical curved surface 312b and a curvature of the second optical curved surface 322b are substantially the same so that a level of difficulty for fabricating the first lens array 300 is lowered and thereby reducing the fabricating costs thereof. In addition, a width of the first lens 312 and a width of the second lens 322 on the second axis Y are substantially the same so as to further reduce the fabricating costs thereof.

Figure 4:
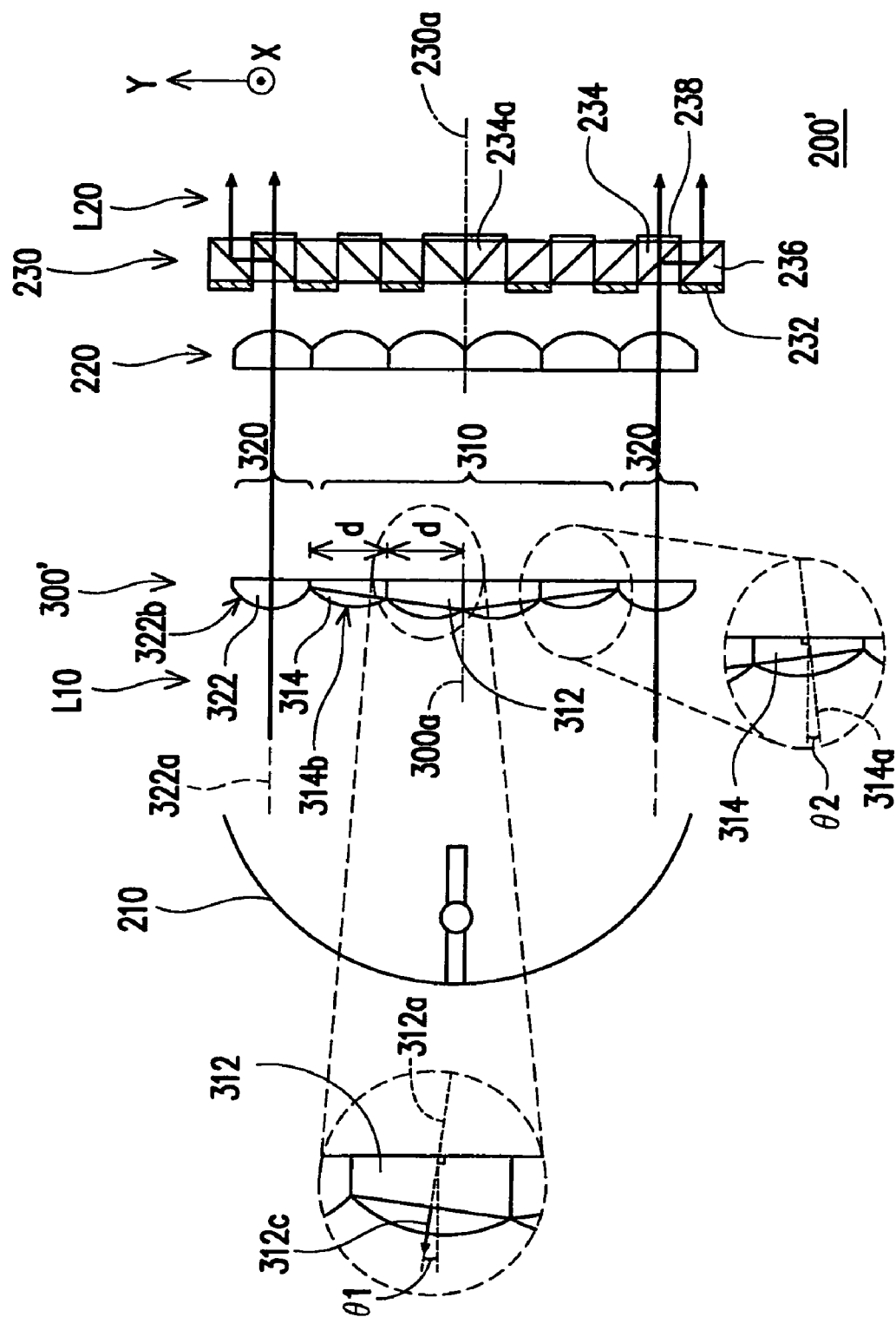
FIG. 4 illustrates an illumination module according to another embodiment of the present invention.

FIG. 4 illustrates an illumination module according to another embodiment of the present invention. It should be explained first that the present embodiment is similar to an embodiment of FIG. 2, and in the present embodiment and the embodiment of FIG. 2, identical or similar reference numerals of devices represent identical or similar devices. Difference between the two embodiments is described in detail hereafter, and similarities thereof are omitted.

According to the present embodiment, a first lens group 310' of a first lens array 300' further includes a plurality of rows of third lenses 314. Each of the third lenses 314 has a third optical curved surface 314b. Each of the third lenses 314 extends along the first axis X, and the third lenses 314 are disposed at two sides of the first lenses 312 along the second axis Y. An optical axis 314a of each of the third optical curved surfaces 314b is perpendicular to the first axis X and has an included angle θ2 larger than 1.5 degrees and smaller than 4 degrees with an optical axis 322a of each of the second optical curved surfaces 322b. In the present embodiment, the included angle θ2 is about 2.5 degrees. Since there is the included angle θ2 between the optical axis 314a of each of the third optical curved surfaces 314b and the optical axis 322a of each of the second optical curved surfaces 322b, the uniformity ratio of the polarized beam L20 is further enhanced.

Table 3 is a comparison sheet between a lens array of a conventional illumination module and the lens array of the present embodiment. Referring to Table 3, it is shown that the efficiency and a uniformity ratio of an illumination module 200' of the present embodiment are both further improved.

TABLE 3

| | Efficiency (%) | Uniformity Ratio |
|---|---|---|
| Conventional lens array coordinated with an asymmetric polarization converting system | 51.9% | 81% |
| First lens array coordinated with the symmetric polarization converting system in the present embodiment | 56% | 94% |
| Gain ratio | 7.9% | 16% |

In summary, since there exists an included angle between the optical axis of the first optical curved surface and the optical axis of the second optical curved surface in the foregoing embodiments, the width of the projection from the illuminating beam passing through the first lenses extends toward the direction of the second axis, shadow caused by adjacent polarization beam splitters in the polarization converting system is thereby mitigated so that the polarized beam is rendered more uniform.

Additionally, in the foregoing embodiments, the curvature of the first optical curved surface of the first lens and that of the second optical curved surface of the second lens may be substantially the same so as to reduce difficulty in fabricating the first lens array and lower the fabricating costs thereof. Further, the width of the first lens and that of the second lens on the second axis may be substantially the same so as to further reduce the fabricating costs thereof.

Moreover, according to the foregoing embodiments, the first lens group may further include the plurality of third lenses optionally. An included angle exists between the optical axis of the third optical curved surface of the third lens and the optical axis of the second optical curved surface. Thus, the polarized beam is further uniformized so that the illumination quality of the illumination module is enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessary limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens array, comprising:
a first lens group having a plurality of rows of first lenses, wherein each of the first lenses has a first optical curved surface and each of the first lenses extends along a first axis;
a second lens group having a plurality of rows of second lenses, wherein each of the second lenses has a second optical curved surface and each of the second lenses extends along the first axis, the second lenses being disposed at two sides of the first lens group along a second axis perpendicular to the first axis, an optical axis of each of the second optical curved surfaces being perpendicular to the first axis and the second axis, an optical axis of each of the first optical curved surfaces being perpendicular to the first axis and having an included angle larger than 0 degree and smaller than 6 degrees with the optical axis of each of the second optical curved surfaces; and
a reference plane being perpendicular to the second axis and passing through the first lens group so that the first lens group and the second lens group are symmetrically disposed with the reference plane, a normal vector of each of the first optical curved surfaces on the optical axis pointing away from the reference plane.

2. The lens array as claimed in claim 1, wherein a curvature of the first optical curved surface and a curvature of the second optical curved surface are substantially the same.

3. The lens array as claimed in claim 1, wherein a width of each of the first lenses along the second axis and a width of each of the second lenses along the second axis are substantially the same.

4. The lens array as claimed in claim 1, wherein the first lens group comprises two rows of the first lenses.

5. The lens array as claimed in claim 1, wherein the included angle between the optical axis of the first optical curved surface and the optical axis of the second optical curved surface is about 3.5 degrees.

6. The lens array as claimed in claim 1, wherein the first lens group further comprises a plurality of rows of third lenses, each of the third lenses has a third optical curved surface and extends along the first axis, the third lenses are disposed at two sides of the first lenses along the second axis, and an optical axis of the third optical curved surface is perpendicular to the first axis and has an included angle larger than 1.5 degrees and smaller than 4 degrees with the optical axis of the second optical curved surface.

7. The lens array as claimed in claim 6, wherein the included angle between the optical axis of the third optical curved surface and the optical axis of the second optical curved surface is about 2.5 degrees.

8. A illumination module, comprising:
a light source, capable of emitting an illuminating beam;
a polarization converting system, disposed on an optical path of the illuminating beam so as to convert the illuminating beam into a polarized beam;
a first lens array, disposed on the optical path of the illuminating beam and located between the light source and the polarization converting system, the first lens array comprising:
a first lens group, having a plurality of rows of first lenses, wherein each of the first lenses has a first optical curved surface and each of the first lenses extends along a first axis;
a second lens group, having a plurality of rows of second lenses, wherein each of the second lenses has a second optical curved surface and each of the second lenses extends along the first axis, the second lenses being disposed at two sides of the first lens group along a second axis perpendicular to the first axis, an optical axis of each of the second optical curved surfaces being perpendicular to the first axis and the second axis, an optical axis of each of the first optical curved surface being perpendicular to the first axis and having an included angle larger than 0 degree and smaller than 6 degrees with the optical axis of each of the second optical curved surfaces; and
a reference plane, being perpendicular to the second axis and passing through the first lens group so that the first lens group and the second lens group are symmetrically disposed with the reference plane, a normal vector of each of the first optical curved surfaces on the optical axis pointing away from the reference plane; and
a second lens array, disposed on the optical path of the illuminating beam and located between the first lens array and the polarization converting system.

9. The illumination module as claimed in claim 8, wherein a curvature of the first optical curved surface and a curvature of the second optical curved surface are substantially the same.

10. The illumination module as claimed in claim 8, wherein a width of each of the first lenses along the second axis and a width of each of the second lenses along the second axis are substantially the same.

11. The illumination module as claimed in claim 8, wherein the first lens group comprises two rows of the first lenses.

12. The illumination module as claimed in claim 8, wherein the included angle between the optical axis of the first optical curved surface and the optical axis of the second optical curved surface is about 3.5 degrees.

13. The illumination module as claimed in claim 8, wherein the first lens group further comprises a plurality of third lenses, each of the third lenses has a third optical curved surface and extends along the first axis, the third lenses are disposed at two sides of the first lenses along the second axis, and an optical axis of the third optical curved surface is perpendicular to the first axis and has an included angle larger than 1.5 degrees and smaller than 4 degrees with the optical axis of the second optical curved surface.

14. The illumination module as claimed in claim 13, wherein the included angle between the optical axis of the third optical curved surface and the optical axis of the second optical curved surface is about 2.5 degrees.

15. The illumination module as claimed in claim 8, wherein the polarization converting system comprises a symmetric polarization converting system.

* * * * *